(12) United States Patent
Joyce et al.

(10) Patent No.: US 6,381,311 B2
(45) Date of Patent: Apr. 30, 2002

(54) AUTOMATED MESSAGE SYSTEM FOR A CALLING PARTY

(75) Inventors: Michael Julian Joyce, Victoria (AU); Ping-Wen Ong, Middletown, NJ (US); Abbas Ourmazd, Berlin (DE); Colin Alan Warwick, Holmdel, NJ (US)

(73) Assignee: AT&T Corp., New York, NY (US)

( * ) Notice: Subject to any disclaimer, the term of this patent is extended or adjusted under 35 U.S.C. 154(b) by 0 days.

(21) Appl. No.: 09/114,969

(22) Filed: Jul. 14, 1998

Related U.S. Application Data

(63) Continuation of application No. 08/694,578, filed on Aug. 9, 1996, now Pat. No. 5,799,066.

(51) Int. Cl.[7] .................................................. H04M 1/64
(52) U.S. Cl. ........................................ 379/88.23; 379/69
(58) Field of Search ............................... 379/67.1, 88.01, 379/88.04, 88.13, 88.14, 88.16, 88.19, 88.21, 88.22, 88.23, 88.24, 88.25, 265, 266, 265.01–266.1, 69

(56) References Cited

U.S. PATENT DOCUMENTS

| | | | |
|---|---|---|---|
| 4,307,266 A | * 12/1981 | Messina | 379/88.23 |
| 4,834,551 A | * 5/1989 | Katz | 379/68 |
| 4,908,845 A | 3/1990 | Little | 379/51 |
| 4,941,168 A | * 7/1990 | Kelly, Jr. | 379/69 |
| 5,283,833 A | 2/1994 | Church et al. | 704/252 |
| 5,333,180 A | * 7/1994 | Brown et al. | 379/88.06 |
| 5,414,754 A | 5/1995 | Pugh et al. | 379/88.23 |
| 5,422,937 A | 6/1995 | Ferrara | 379/67.1 |
| 5,430,792 A | 7/1995 | Jesurum et al. | 379/88.01 |
| 5,450,488 A | 9/1995 | Pugaczewski et al. | 379/67.1 |
| 5,475,731 A | 10/1995 | Witherspoon | |
| 5,467,391 A | 11/1995 | Donaghue, Jr. et al. | 379/265 |
| 5,457,731 A | 12/1995 | Witherspoon | 379/3 |
| 5,526,417 A | 6/1996 | Dezonno | 379/265 |
| 5,581,602 A | * 12/1996 | Szlam et al. | 379/88.05 |
| 5,608,786 A | * 3/1997 | Gordon | 370/352 |
| 5,644,624 A | * 7/1997 | Caldwell | 379/69 |
| 5,687,225 A | 11/1997 | Jorgensen | 379/265 |
| 5,724,407 A | * 3/1998 | Bruno et al. | 379/88.13 |
| 5,799,066 A | * 8/1998 | Joyce et al. | 379/88.04 |
| 5,875,231 A | * 2/1999 | Farfan et al. | 379/67.1 |
| 5,884,262 A | * 3/1999 | Wise et al. | 704/270 |
| 6,064,874 A | * 5/2000 | Cox et al. | 455/404 |

OTHER PUBLICATIONS

Newton, H., Newton's Telecom Dictionary, Mar. 1998, Flatiron Publishing, ISBN 1–57820–023–7, 14th Ed., p. 136 and 616.*

IBM, Method for Automatically Leaving Messages on Answer Machines, Aug. 1993, IBM Technical Disclosure Bulletin, Acc. No. NN9308159, vol. 36, No. 8, pp. 159–160.*

* cited by examiner

Primary Examiner—Fan Tsang
Assistant Examiner—Roland G. Foster
(74) Attorney, Agent, or Firm—Oliff & Berridge, PLC

(57) ABSTRACT

An automated message system sends a message of the calling party to the called party in response to a control signal. The automated message system includes a telephone network, a first telephone station, a second telephone station used by the called party and an automated message unit coupled to the first and second telephone stations through the network. A controller of the automated message unit that receives the control signal from the calling party selects a database from a memory device and retrieves a message from the database based on information included in the control signal. If an answering machine answers the calling party's call, the controller waits for the answering machine message to complete and sends the message retrieved from the database to the second telephone station of the called party.

2 Claims, 3 Drawing Sheets

AUTOMATED MESSAGE SYSTEM FOR A CALLING PARTY

This is a continuation of application Ser. No. 08/694,578 filed Aug. 9, 1996, now U.S. Pat. No. 5,799,066. This entire discloser of the prior application(s) is hereby incorporated by reference herein in its entirety.

BACKGROUND OF THE INVENTION

1. Field of the Invention

This invention relates to an automated message system and method for sending messages to a called party.

2. Description of Related Art

Automated message systems are often used in telephone communications. A common example is an answering machine. Typically in such systems, a calling party receives an automated message after calling a called party. The automated message may contain instructions directing the calling party to take certain actions such as "Please leave a message after the tone."

A typical answering machine, for example, plays a pre-recorded message that may take several seconds to complete before directing the calling party to respond. When the calling party is very busy or is using a high cost connection such as a cellular network, the time required to interface with an answering machine may be expensive to the calling party both in terms of lost productivity and telephone connection costs. Thus, technological improvements are needed to reduce the cost to a calling party when receiving automated messages from a called party.

SUMMARY OF THE INVENTION

This invention provides an automated message system and method for sending a message from a calling party to a called party when the called party's telephone is answered by an answering machine. The automated message system connects to the called party in response to a control signal generated by the calling party. The control signal may be a dual tone multiple frequency (DTMF) signal generated by the calling party by pressing a key of a keypad. The automated message system waits for the answering machine's message to complete and leaves the calling party's message on the called party's answering machine at the appropriate time. Thus, the calling party may go on-hook and call another called party.

The automated message system also reduces the high cost of cellular phone connections of the calling party. The calling party stops paying for cellular phone costs after the automated message system connects to the called party and the calling party goes on-hook. The time that the automated message system spends waiting for the called party's answering machine message to complete and the time spent outputting the calling party's message is covered by a much lower landline costs. Thus, the calling party's costs for leaving the message on the called party's answering machine is greatly reduced.

BRIEF DESCRIPTION OF THE DRAWINGS

The invention is described in detail with reference to the following drawings, wherein like numerals represent like elements.

DETAILED DESCRIPTION OF PREFERRED EMBODIMENTS

Figure 1:
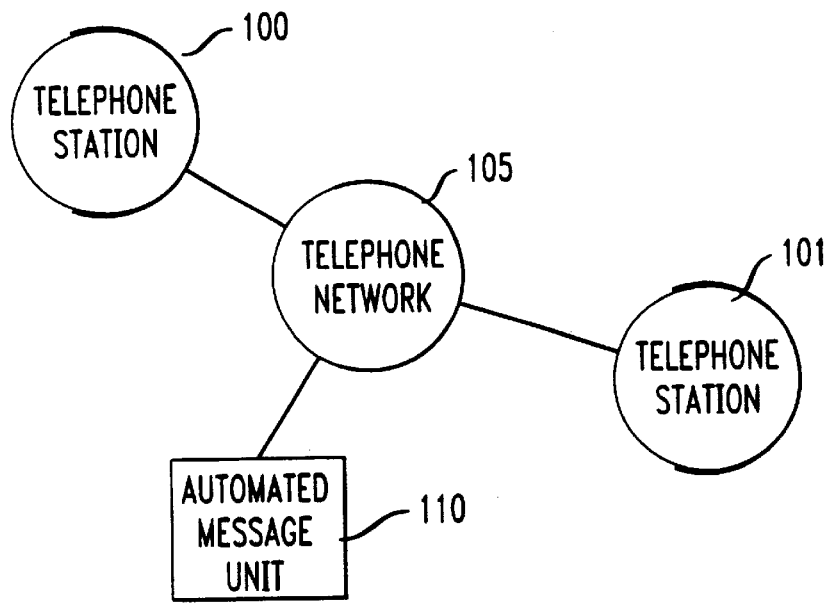
FIG. 1 is a diagram of an automated message system.

FIG. 1 shows telephone stations 100 and 101 connected to an automated message unit 110 through a telephone network 105. Telephone stations 100 and 101 may be either landline telephone stations or cellular phones wirelessly connected to a base station (not shown). When a calling party, using the telephone station 100, calls a called party by dialing a telephone number of the telephone station 101 and an answering machine answers with a message, the calling party may request the automated message unit 110 to complete the call. The calling party may then go on-hook while the automated message unit 110 waits to leave a message for the calling party.

The calling party requests the automated message unit 110 to complete the call by sending a control signal. The control signal may be generated when the calling party presses a key of a keypad of the telephone station 100, for example. The automated message unit 110 responds to the control signal by connecting to the telephone station 101 and permitting the calling party to go on-hook. The control signal may include a DTMF signal when the calling party uses a landline telephone. The automated message system 110 waits for the answering machine's message to complete and, at the appropriate time, outputs the calling party's message to the answering machine.

Figure 2:
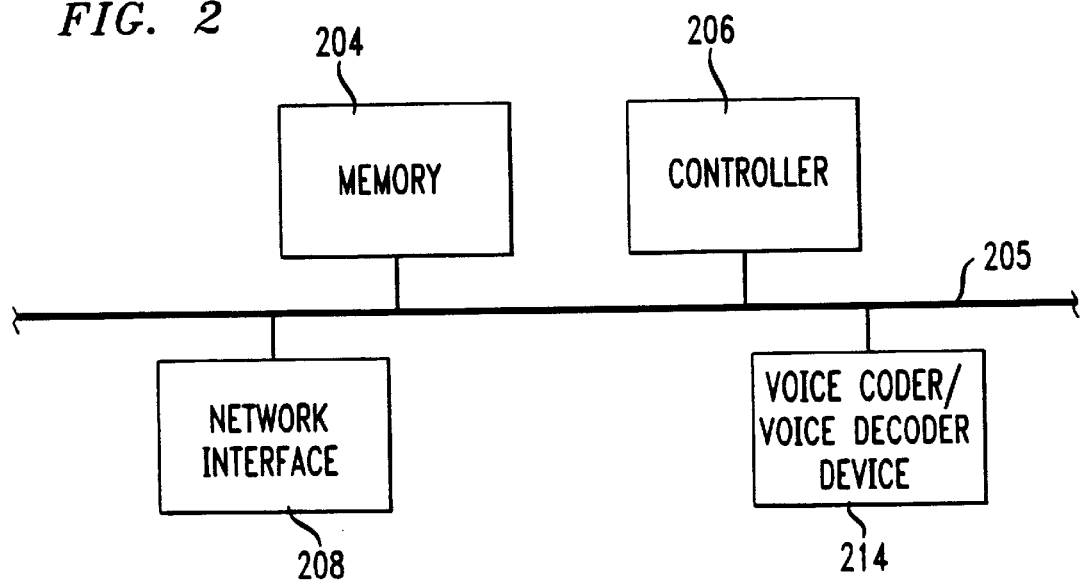
FIG. 2 is a block diagram of the automated message unit.

FIG. 2 is a block diagram of the automated message unit 110. The automated message unit 110 includes a controller 206, a memory 204, a network interface 208 and a voice coder/voice decoder device 214. Examples of voice coder/voice decoder devices include a waveform encoder/decoder and a voice recognition/text-to-voice device. The above components are all connected through signal line 205. The network interface 208 may be coupled to the telephone network 105 through a device such as a public switched telephone network (not shown). The network interface 208 interacts with the public switched telephone network to connect or disconnect calls by using standard features of the public switched telephone network.

The operation of the automated message unit 110 will be described below assuming that the calling party is using a cellular phone and that the calling party's call is answered by the called party's answering machine. However, the automated message unit 110 functions in other circumstances such as the calling party using a landline telephone station or the called party answers the calling party's call.

When the called party's answering machine answers the calling party's call and the calling party sends the control signal, the controller 206 receives the control signal through the network interface 208. The controller 206 connects to the called party through the network interface 208 and optionally disconnects the calling party. The calling party may also disconnect by going on-hook after sending the control signal.

After receiving the control signal from the calling party, the controller 206 retrieves a database based on an identification code. The control signal includes the identification code that identifies the calling party. For example, the cellular phone may output, in a data channel, an equipment identification number (EIN) that uniquely identifies the Cellular phone. If a landline telephone station is used, the telephone number of the landline telephone station may be obtained via caller ID, for example, and the caller ID may be used to identify the calling party. The calling party may also enter the identification code by pressing the keys of the keypad on the landline telephone station to identify the calling party. In any case, the controller 206 receives the identification code in the control signal and locates the database associated with the calling party in the memory 204.

The database of the calling party contains data such as messages saved by the calling party. The controller 206 receives control information included in the control signal and selects one of the messages in the database based on the control information. The controller 206 retrieves the selected message and outputs the selected message to the called party through the network interface 208.

If the calling party has only one message stored in the database, then the calling party may send the control signal by simply pressing "*" or some other preassigned key of the keypad of the cellular phone. If the calling party has more than one message stored in the database, the calling party may select one of the messages by pressing "*99", for example. Alternatively, dedicated keys of the keypad may be assigned to different messages similar to "speed dial" keys so that pressing a single key can generate the desired control signal to select the desired message. Special key sequences of speed dial keys may also be assigned for selecting messages such as entries in the calling party's telephone directory stored in the memory 204.

If greater security is desired to prevent the automated message unit 110 from being misused, the calling party may establish a password. The control signal sent to the controller 206 may include the password and the controller 206 verifies the password against a password contained in the database. If the password is incorrect, the controller 206 ends the automated message process without connecting to the called party.

Information from the calling party such as the password, the messages and the telephone directories are stored in the database of the memory 204. The calling party may enter this information through a telephone station such as telephone station 100. The calling party calls the automated message unit 110 by dialing an 800 number, for example, and enters data either by using the keypad of the telephone station 100 or by speaking to the automated message unit 110 if voice coder features are available for storing text and audio prints for playback.

After calling the automated message unit 110, the calling party enters instructions to the controller 206 in response to prompts of the controller 206. The calling party may create a new message or a new telephone directory or may enter change instructions such as add, delete, or replace to change existing messages or entries in an existing telephone directory.

The automated message unit 110 may include a voice coder/voice decoder device 214 as shown in FIG. 2. The voice coder/voice decoder device 214 receives audio data from the calling party through the network interface 208, converts the audio data into text and sends the text to the controller 206. The controller 206 incorporates the text into the database associated with the calling party and stores the database in the memory 204.

When the calling party sends the control signal during a call to a called party, the controller 206 retrieves the text from the database stored in the memory 204. The controller 206 sends the text to the voice coder/voice decoder device 214 to convert the text into audio. Then the voice coder/voice decoder device 214 outputs the audio to the called party through the network interface 208.

If voice coder/voice decoder conversion is not available, the controller 206 may receive the calling party's audio directly as an audio print and store the audio print in the memory 204. When the calling party sends the control signal and the selected message or telephone directory entry contains an audio print, the controller 206 outputs the audio print directly to the called party through the network interface 208.

A password may be set by the calling party when creating a database or when initially subscribing to the automated messaging service. The controller 206 verifies that the password is entered correctly before allowing the calling party access to a database. The controller 206 may allow a preset number of incorrect password entries before ending the calling party's call.

The above described automated message unit 110 enables the calling party to leave a message for the called party without the calling party having to wait for the called party's answering machine to finish its message. The calling party is able to save both valuable personal time and possibly telephone connection costs associated with the time required for the answering machine to finish its message.

For example, the calling party may be a traveling business person using a cellular phone to call potential clients. When a call is answered by an answering machine, the business person is relieved from waiting by the automated message unit 110 and may make a call to another client. Further, because the automated message unit 110 leaves a message, the business person's call would not be wasted. For example, an "electronic" business card may be left as a message in the client's answering machine.

Moreover, because the automated message unit 110 is a land based system, the cost associated with the automated message unit 110 waiting for the called party's answering machine to finish its message and leaving the calling party's message is small when compared to the calling parties cellular phone costs.

The automated message unit 110 may be used for other convenient purposes as well. For example, the calling party may send a telephone number of a third party to the called party from the calling party's telephone directory stored in the automated message unit 110.

Figure 3:
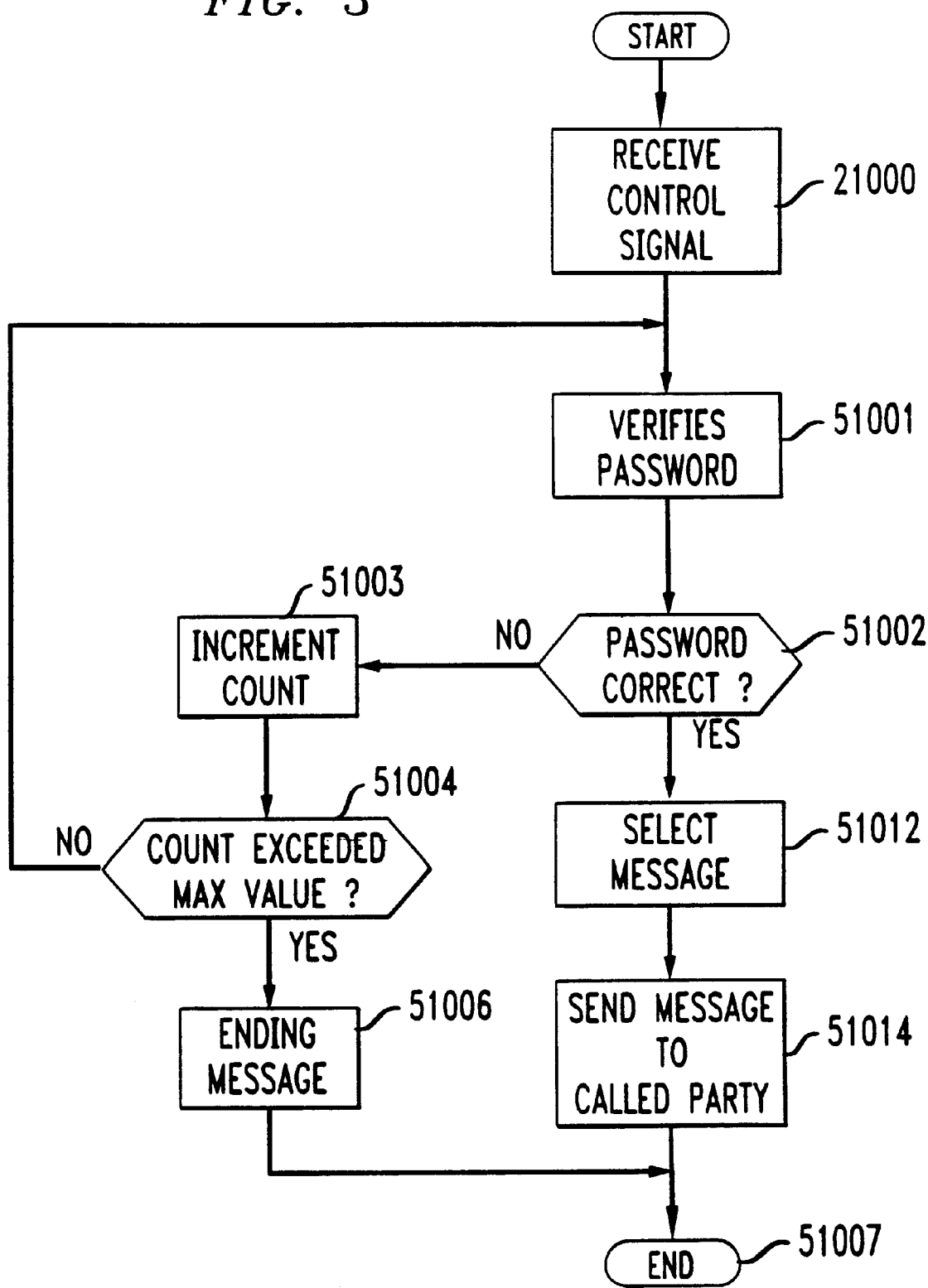
FIG. 3 is a flowchart of a process for sending a message using the automated message system.

FIG. 3 shows a flowchart of a process for sending a message from the automated message unit 110 after the calling party calls the called party and an answering machine answers. In step S1000, the automated message system 110 receives a control signal from the calling party through the network interface 208. After receiving the control signal, the controller 206 retrieves the database associated with the calling party from the memory 204 based on the identifying code in the control signal such as the EIN. Then the controller goes to step S1001.

In step S1001, the controller 206 compares the password in the control signal against a password in the retrieved database to verify that the password in the control signal is correct. The controller 206 then goes to step S1002. In step S1002, if the password in the control signal is incorrect the controller 206 goes to step S1003. Otherwise, the controller 206 goes to step S1012.

In step S1003, the controller 206 increments a count and checks if the count exceeds a maximum value. Then the controller 206 goes to step S1004. In step S1004, the controller 206 goes to step S1006 if the count exceeds the maximum value. Otherwise, the controller 206 goes to step S1005.

In step S1012, the controller 206 connects to the called party and selects a message from the database based on the control information in the control signal. At this point, the calling party may either go on-hook or be disconnected by the controller 206. Then the controller 206 goes to step S1014. In step S1014, the controller 206 waits for the answering machine to finish its message, if it has not already done so, and sends the calling party's message to the called party. If the called party answers instead of the answering machine, then the controller 206 sends the calling party's message without waiting. The controller 206 then goes to step S1007 and ends the message sending process.

If the message selected by the controller 206 is an audio print, then the controller 206 directly outputs the audio print message to the called party. If the selected message is a text message, the controller 206 sends the text to the voice coder/voice decoder device 214 for conversion to audio and outputs the audio to the called party.

Figure 4:
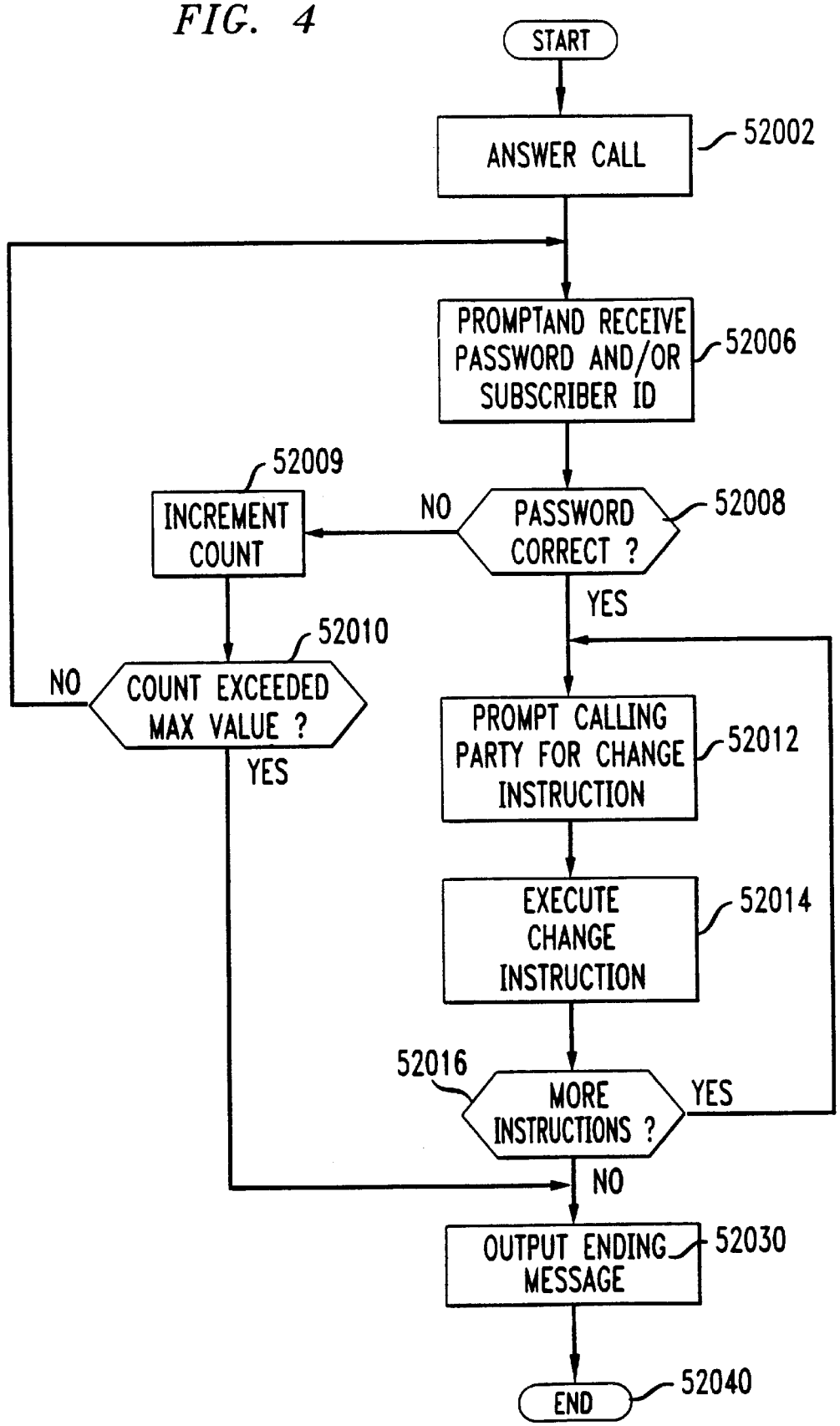
FIG. 4 is a flowchart of a process for recording a message in the automated message unit for playback to a called party.

FIG. 4 shows a flowchart of a process for entering and changing information in the database associated with the calling party. In step S2002, the controller 206 answers a call from the calling party and selects a database in the memory 204 that is associated with the calling party. The database is selected based on an identification code entered by the calling party or an EIN if a cellular phone is used. Then the controller 206 goes to step S2006.

In step S2006 the controller 206 prompts the calling party to enter a password. The controller 206 verifies if the entered password is correct based on information in the selected database. Then, the controller 206 goes to step S2008.

In step S2008, if the password provided by the calling party is incorrect, the controller 206 goes to step S2009. Otherwise, the controller 206 goes to step S2012. In step S2009, the controller 206 increments a count and checks if the count exceeds a maximum value and goes to step S2010. In step S2010, if the count exceeds the maximum value, the controller 206 goes to step S2030. Otherwise the controller returns to step S2006. In step S2030, the controller 206 sends an ending message and goes to step S2040 to end the call.

In step S2012, the controller 206 prompts the calling party for an instruction to either create information or change the information contained in the database associated with the calling party. Instructions such as add, delete or replace identified messages or entries in a telephone directory contained in the database may be provided. Other instructions such as delete the database or create new database are also possible. The instructions may be entered either by pressing keys of the keypad of the telephone station or by audio instructions if voice coding is available. Then the controller 206 goes to step S2014.

In step S2014, the controller 206 executes the instruction entered by the calling party and queries whether the calling party has more instructions. Then the controller 206 goes to step S2016. In step S2016, the controller 206 goes to step S2030 if the calling party has no more instructions. Otherwise, the controller 206 returns to step S2012.

While this invention has been described in conjunction with specific embodiments thereof, it is evident that many alternatives, modifications and variations will be apparent to those skilled in the art. For example, the automated message unit 110 may be implemented by one or more application specific integrated circuits (ASICs). The automated message unit 110 may also be implemented as programs executing in a processor such as a general purpose computer or a microprocessor. Accordingly, preferred embodiments of the invention as set forth herein are intended to be illustrative, not limiting. Various changes may be made without departing from the spirit and scope of the invention as defined in the following claims.

What is claimed is:

1. An automated message system comprising a telephone network; a first telephone station and a second telephone station; an automated message unit coupled to the first and second telephone stations through the telephone network; a network interface coupled to the telephone network; a memory device; a controller coupled to the network interface in the memory device, wherein the controller receives the control signal from the first telephone station through the network interface, retrieves the message from the memory device based on the control signal and sends the message to the second telephone station through the network interface; wherein the controller receives a call from the first telephone station to the automated message unit, the calling party enters an instruction to the controller to store at least one message in a data base in the memory device associated with the calling party; and the second telephone station is answered and does not put the calling party on hold, wherein the automated message unit further comprises:

a voice coder/voice decoder device, the instruction being entered by at least one of pressing a keypad of a telephone station and speaking an audio command, and if the instruction is the audio command, then the voice coder/voice decoder device converts the auto command into text and sends the text to the controller.

2. A method for operation of an automated message system comprising:

receiving a control system from a first telephone station of a calling party after a call from the first telephone station to a second telephone station of a called party is answered and not put on hold; sending a message to the second telephone station in response to the control signal before the call is terminated; retrieving the message from a memory device of the automated message unit, wherein a controller of the automated message unit retrieves the message based on the control signal received by the controller through a network interface of the automated message unit, the controller sending the message to the second telephone station through the network interface; receiving a call from the calling party to the automated message unit, the controller of the automated message unit receiving the calls, entering an instruction to the controller to store at least one message in the database associated with the calling party; and further comprising:

converting the instruction from voice to text using a voice recognition device if the instruction is entered by the calling party by speaking a voice command.

* * * * *